US012311397B1

(12) United States Patent
Jia et al.

(10) Patent No.: US 12,311,397 B1
(45) Date of Patent: May 27, 2025

(54) ULTRASONIC CONTROL APPARATUS AND METHOD FOR LIQUID JET

(71) Applicants: Beijing Jiaotong University, Beijing (CN); Tangshan Research Institute of Beijing Jiaotong University, Tangshan (CN)

(72) Inventors: Boqi Jia, Beijing (CN); Yusong Yu, Beijing (CN); Qingfei Fu, Beijing (CN); Sulun Guan, Beijing (CN); Minshuo Liang, Beijing (CN)

(73) Assignees: BEIJING JIAOTONG UNIVERSITY, Beijing (CN); TANGSHAN RESEARCH INSTITUTE OF BEIJING JIAOTONG UNIVERSITY, Tangshan (CN)

( * ) Notice: Subject to any disclaimer, the term of this patent is extended or adjusted under 35 U.S.C. 154(b) by 0 days.

(21) Appl. No.: 19/005,083

(22) Filed: Dec. 30, 2024

(30) Foreign Application Priority Data

Mar. 28, 2024 (CN) ......................... 202410365735.8

(51) Int. Cl.
*B05B 17/06* (2006.01)

(52) U.S. Cl.
CPC ...... *B05B 17/0615* (2013.01); *B05B 17/0669* (2013.01); *B05B 17/0676* (2013.01)

(58) Field of Classification Search
CPC ............ B05B 17/0615; B05B 17/0669; B05B 17/0676; B05B 17/0653; B05B 7/0012; B05B 7/2491; B05B 7/0661; B05B 7/0607; B05B 7/0646; B05B 7/0653; B05B 1/002; A61M 11/005; A61M 11/001
See application file for complete search history.

(56) References Cited

U.S. PATENT DOCUMENTS 7,934,703 B2 * 5/2011 Tomono ............... A61M 11/048
261/DIG. 65

FOREIGN PATENT DOCUMENTS

| | | |
|---|---|---|
| CN | 103618026 A | 3/2014 |
| CN | 107983600 A | 5/2018 |
| CN | 108295915 A | 11/2020 |
| CN | 114833013 A | 8/2022 |
| CN | 116273226 A | 6/2023 |
| CN | 219111591 U | 6/2023 |

* cited by examiner

*Primary Examiner* — Christopher R Dandridge
(74) *Attorney, Agent, or Firm* — WCF IP

(57) ABSTRACT

An ultrasonic control apparatus and method for a liquid jet are provided. An ultrasonic generator is equipped with two sets of ultrasonic transducers arranged perpendicularly to each other, and the two sets of ultrasonic transducers emit ultrasonic waves of a specific frequency. Two sets of reflectors are arranged correspondingly in front of the ultrasonic waves emitted by the two sets of ultrasonic transducers, where a distance exists between the ultrasonic transducers and the corresponding reflectors, two stable standing wave sound fields are formed by adjusting the distance. A liquid jet device is equipped with a nozzle that emits a continuous jet, where the nozzle is located above an intersection of pressure nodes of the two standing wave sound fields, and the two standing wave sound fields act on the liquid jet to adjust jet morphology under the action of acoustic radiation pressures.

16 Claims, 3 Drawing Sheets

ULTRASONIC CONTROL APPARATUS AND METHOD FOR LIQUID JET

CROSS REFERENCE TO RELATED APPLICATION

This patent application claims the benefit and priority of Chinese Patent Application No. 2024103657358, filed with the China National Intellectual Property Administration on Mar. 28, 2024, the disclosure of which is incorporated by reference herein in its entirety as part of the present application.

TECHNICAL FIELD

The present disclosure relates to the technical field of liquid jet control, and in particular, to an ultrasonic control apparatus and method for a liquid jet.

BACKGROUND

Research on liquid jets has made certain progress both domestically and internationally. Domestic research mainly focuses on technical applications, jet characteristics, and the interaction between jets and solids, while international research is more concentrated on numerical simulation and modeling, technological improvements, and applications in the medical and energy fields. However, existing jet control methods suffer from low stability and limited adjustment ranges. By researching new technologies and improving traditional methods, the precision, stability, and controllability of liquid jets can be continuously enhanced to meet the demands for liquid jet control in various fields.

Ultrasonic control technology has shown great potential in controlling jet behavior. The integration of ultrasonic technology with other control techniques can achieve highly precise control over jet behavior and stability. However, current research on ultrasonic control methods for liquid jets mainly focuses on applying an ultrasonic field in a single direction to a liquid jet and controlling the behavior of the liquid jet by adjusting ultrasonic parameters. There are still limitations in improving the precision, stability, and controllability of liquid jets.

Previous methods for ultrasonic control of liquid behavior have focused more on the behavior of droplets under the action of acoustic radiation pressure. An ultrasonic droplet control system disclosed in Chinese Patent Application No. CN202310346585.1 and an ultrasonic droplet control system disclosed in Chinese Patent Application No. CN202223429928.0 can achieve precise control of discrete droplets through ultrasound, but they cannot achieve precise control of continuous jets.

For the control of continuous jets, two methods are typically used: electric control and ultrasonic control. Chinese Patent Application No. CN201810049101.6, entitled "Method and Apparatus for Controlling Jet Breakup and Droplet Generation," discloses an electric control method, while Chinese Patent Application No. CN202210473271.3, "Piezoelectric Monodisperse Droplet Generation Apparatus and Generation Method," discloses an ultrasonic control method. However, both methods cannot adjust the diameter of a continuous jet, and the control and adjustment effects on jet morphology, jet velocity, and stability are poor. Therefore, these methods can usually only be applied within a wavelength range of unstable jets (wavelength>jet circumference), limiting the dimensions and range of adjustment.

Thus, it is a pressing problem in the field to provide an ultrasonic control apparatus and method for a liquid jet, which is based on acoustic radiation pressure and can precisely control the diameter of a continuous jet to meet the special requirements for the shape and stability of liquid jet behavior in industrial production.

SUMMARY

In view of this, the present disclosure provides an ultrasonic control apparatus for a liquid jet, which achieves precise control of jet diameter based on the principle of acoustic radiation pressure through a dual-axis orthogonal ultrasonic field.

To achieve the above objective, the present disclosure adopts the following technical solutions: an ultrasonic control apparatus for a liquid jet, including:

- an ultrasonic generator equipped with two sets of ultrasonic transducers arranged perpendicularly to each other, where the two sets of ultrasonic transducers emit ultrasonic waves of a specific frequency;
- two sets of reflectors arranged correspondingly in front of the ultrasonic waves emitted by the two sets of ultrasonic transducers, where a distance exists between the ultrasonic transducers and the corresponding reflectors, two stable standing wave sound fields are formed by adjusting the distance, and center lines of the two standing wave sound fields are coplanar and perpendicular to each other; and
- a liquid jet device equipped with a nozzle that emits a continuous jet, where the nozzle is located above an intersection of pressure nodes of the two standing wave sound fields, and the two standing wave sound fields act on the liquid jet to adjust jet morphology under the action of acoustic radiation pressures.

The present disclosure has the following beneficial effects: By forming two standing wave sound fields with two sets of ultrasonic transducers and two sets of reflectors, a liquid jet is ejected at a common node of the two standing wave sound fields. The jet is subjected to the action of two radial acoustic radiation pressures. By adjusting the sound pressure, the liquid jet experiences a radial pressure under the action of the acoustic radiation pressure, reducing its diameter. By adjusting the amplitude of the sound pressure, the diameter of the jet can be regulated. Additionally, by modulating an input signal of the ultrasonic generator, a low-frequency signal can be superimposed on a high-frequency input to generate modulated ultrasound. Based on the unstable frequency of the jet, a modulated waveform can be superimposed to achieve control over jet breakup, i.e., droplet size control, allowing for control over the disturbance frequency and modulation depth, as well as more precise control over the breakup length, unstable wavelength, and the diameter of the generated droplets, thus achieving the function of generating monodisperse droplets.

Preferably, the ultrasonic generator further includes an ultrasonic signal generator and two sets of power amplifiers. The two sets of power amplifiers are electrically connected to the two sets of ultrasonic transducers, respectively. The ultrasonic signal generator is electrically connected to the two sets of power amplifiers, and both the ultrasonic signal generator and the power amplifiers are placed on an optical platform.

The technical effect produced by this arrangement is that the acoustic frequency can be adjusted as needed to meet predetermined measurement requirements.

Preferably, the optical platform is connected to two sets of adjustable sliding rails that are dual-axis adjustable sliding rails that allow for X and Y axis adjustments. The adjustable sliding rails are connected to a clamping seat for fixing the ultrasonic transducers, allowing the ultrasonic transducers to adjust a positional relationship with the reflectors under the action of the adjustable sliding rails.

The technical effect produced by this configuration is that the adjustable sliding rails can be used to adjust the X and Y positions of the clamping seat and the ultrasonic transducers, obtaining stable standing wave sound fields with the cooperation of the reflectors.

Preferably, the optical platform is connected to vertical rails, on which a telescopic platform is slidably connected. The nozzle is fixedly connected to a telescopic end of the telescopic platform and adjusts a horizontal position of the nozzle. The optical platform is connected to an injection pump, where an outlet of the injection pump is connected to the nozzle to provide a liquid jet at a specific speed.

The technical effect produced by this setup is that the injection pump provides a liquid jet at a specific speed, and the state of the jet can be adjusted using acoustic radiation pressures. The telescopic platform can adjust the horizontal position of the nozzle, while the vertical rails can adjust the height of the nozzle to meet experimental conditions.

Preferably, a power range obtained through joint adjustment by the ultrasonic signal generator and the power amplifiers is 0 to 2 kW, with a frequency range of a generated alternating voltage being 0.2 kHz to 40 kHz.

Preferably, a frequency range of the ultrasonic transducers is 15.0 kHz to 40.0 kHz, and a power of the ultrasonic transducers is 0.3 kW to 2 kW.

Preferably, the injection pump is a peristaltic pump, with a jet flow rate of 10 to 90 ml/min. A connection end of the nozzle is connected to an outlet pipeline of the injection pump, and the connection end has a pipe diameter of 1 to 3 mm.

Preferably, the distance between the ultrasonic transducers and the reflectors satisfies the following formula: $d_1=Ac/f$, where $d_1$ represents the distance, and A is a value coefficient, with different values of A corresponding to nodes at different positions. At these positions, control over the flow state can be achieved. Theoretically, A can take values of 1, 2, 3, etc., but in practical applications, the value of A cannot be precisely set to 1, 2, etc. Therefore, coefficient ranges for A are defined as 0.95 to 1.05, 1.9 to 2.1, etc. Within these ranges, a controlled flow phenomenon can be generated, where c is a local sound speed and f is an ultrasonic frequency.

Preferably, a distance from an ultrasonic focus area generated by the ultrasonic transducer in conjunction with the reflector to the reflectors is defined as follows:

$$d_2 = Bc/f,\ B = C\frac{2n+1}{4},\ C = 0.95 - 1.05,\ B < A$$

where B and C jointly determine node positions; C, like A, is also a coefficient that should theoretically be set to 1, but is not 1 in practice, and thus a value range is defined.

The present disclosure also discloses a control method using the ultrasonic control apparatus for a liquid jet, which includes the following steps:

step 1: powering on the ultrasonic generator, causing the two sets of ultrasonic transducers to generate specific ultrasonic waves;

step 2: adjusting positions of the ultrasonic transducers and the distance between the ultrasonic transducers and the reflectors, to ensure that center lines of sound fields formed by the two sets of ultrasonic transducers and the corresponding reflectors are coplanar and perpendicular to each other, thereby forming stable standing wave sound fields between the ultrasonic transducers and the reflectors;

step 3: adjusting a position of the nozzle, such that the nozzle is directly above an intersection of pressure nodes of the two standing wave sound fields;

step 4: connecting the nozzle to an external pumping source, allowing the nozzle to emit a continuous jet; adjusting a power of the ultrasonic generator to increase an ultrasonic amplitude and enhance an acoustic radiation pressure, where the ultrasonic waves are reflected by the reflectors, generating the standing wave sound fields, and the jet is narrowed under the action of the acoustic radiation pressure; the ultrasonic waves from two directions act on the jet, thus achieving control over a diameter and flow rate of the jet; and step 5: modulating an input signal by superimposing a low-frequency signal on a high-frequency input to generate modulated ultrasound, achieving control over a droplet size after jet breakup.

The present disclosure has the following beneficial effects: it utilizes the standing wave sound fields formed by the ultrasonic generator and the reflectors to adjust the state of the liquid jet, achieving droplet suspension and controlling the liquid jet. The liquid jet is ejected at the common nodes of the two standing wave sound fields, subjected to the action of two radial acoustic radiation pressures. By adjusting the sound pressure, control and adjustment of the liquid jet diameter and flow rate can be achieved. Additionally, a modulated waveform can be superimposed to achieve control over jet breakup, i.e., droplet size control, allowing for control over the disturbance frequency and modulation depth, as well as more precise control over the breakup length, unstable wavelength, and the diameter of the generated droplets, thus achieving the function of generating monodisperse droplets.

Figure 1:
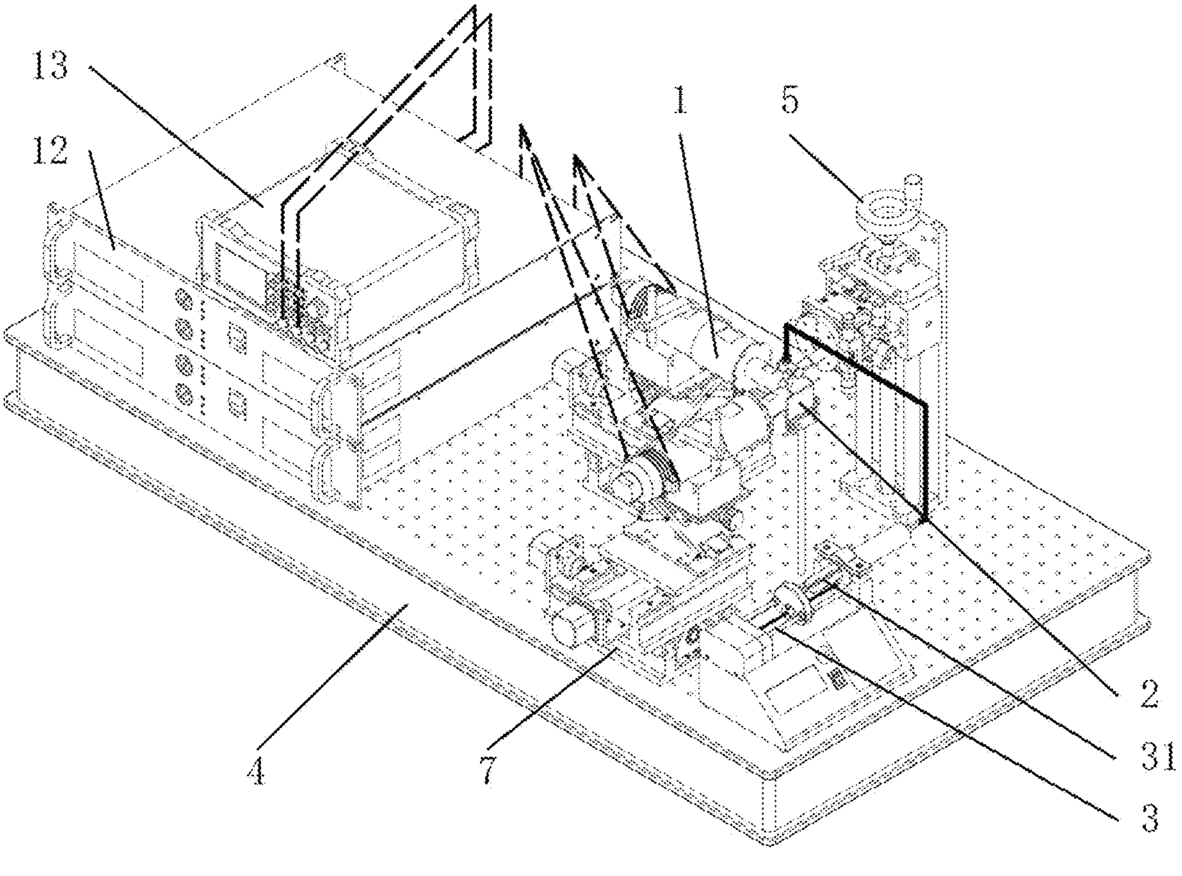
FIG. 1 is an overall structural diagram of an ultrasonic control apparatus for a liquid jet according to the present disclosure.

Meanings of reference numerals: 1: ultrasonic generator; 11: ultrasonic transducer; 12: power amplifier; 13: ultrasonic signal generator: 2: reflector; 3: liquid jet device; 31: nozzle; 32: injection pump; 4: optical platform; 5: vertical rail; 6: telescopic platform; 7: adjustable sliding rail.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 2:
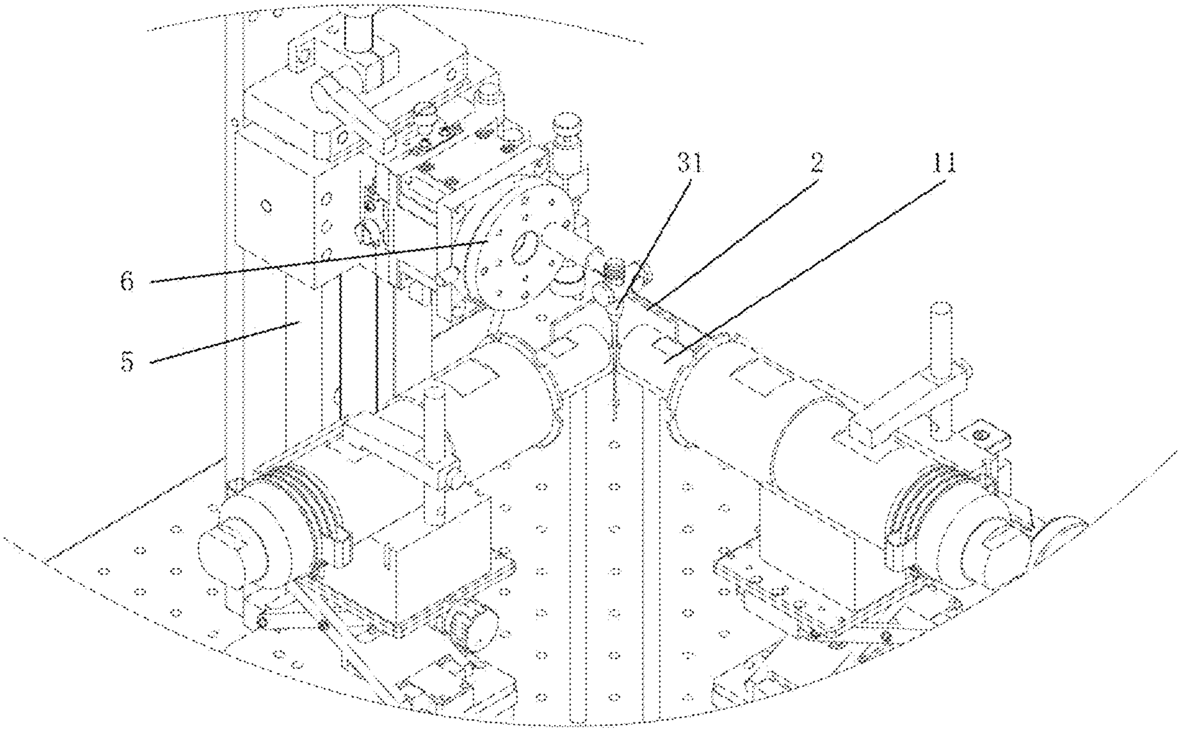
FIG. 2 is a partially enlarged schematic diagram view of the ultrasonic control apparatus for a liquid jet according to the present disclosure.
Figure 3:
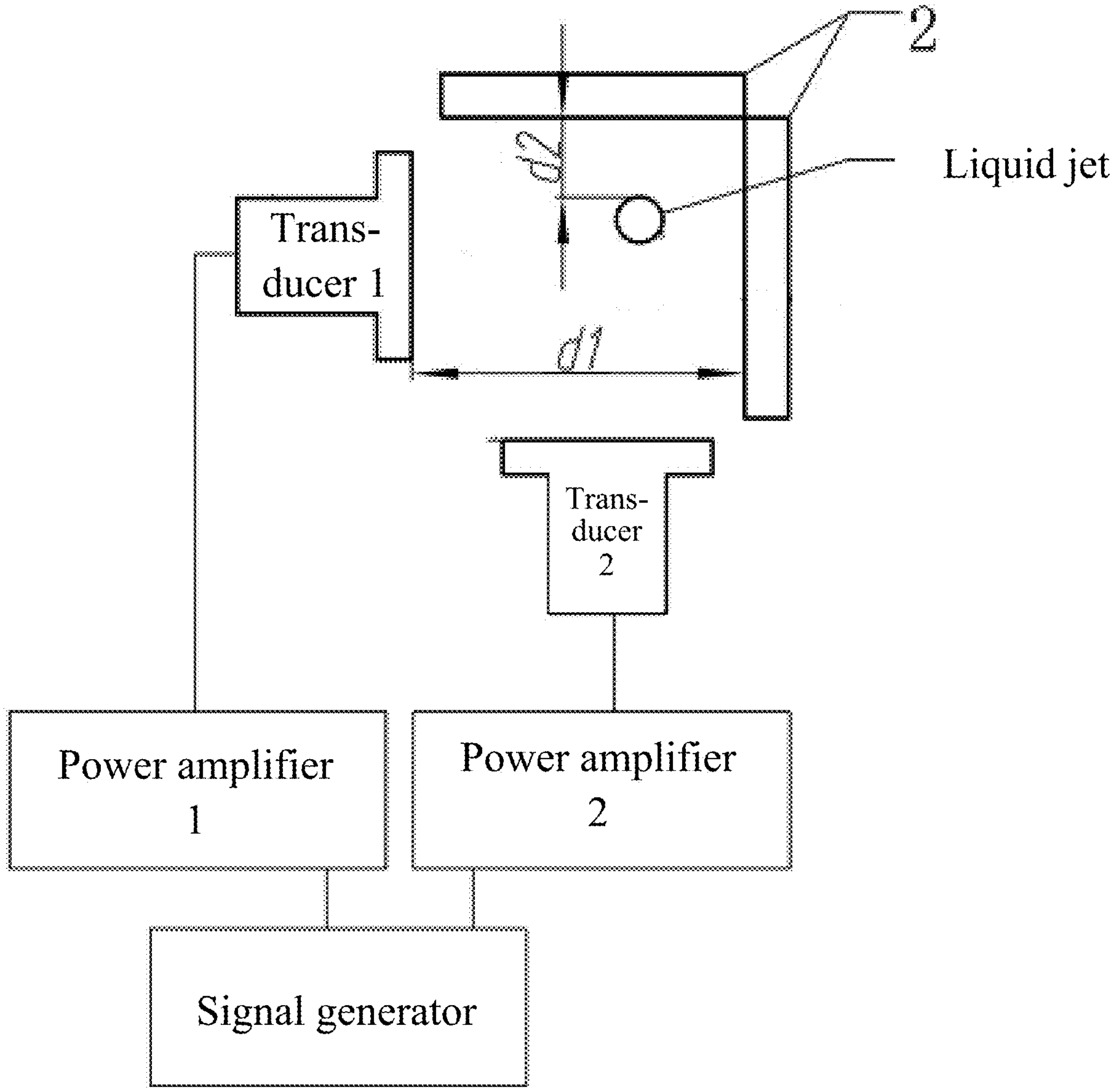
FIG. 3 is a diagram showing the interaction between ultrasonic transducers and a liquid jet in the ultrasonic control apparatus for a liquid jet according to the present disclosure.

Referring to FIG. 1 to FIG. 3, an ultrasonic control apparatus for a liquid jet according to an embodiment of the present disclosure includes:

- an ultrasonic generator 1 equipped with two sets of ultrasonic transducers 11 arranged perpendicularly to each other, where the two sets of ultrasonic transducers 11 emit ultrasonic waves of a specific frequency;
- two sets of reflectors 2 arranged correspondingly in front of the ultrasonic waves emitted by the two sets of ultrasonic transducers 11, where a distance exists between the ultrasonic transducers 11 and the corresponding reflectors 2, two stable standing wave sound fields are formed by adjusting the distance, and center lines of the two standing wave sound fields are coplanar and perpendicular to each other; and
- a liquid jet device 3 equipped with a nozzle 31 that emits a continuous jet, where the nozzle 31 is located above an intersection of pressure nodes of the two standing wave sound fields, and the two standing wave sound fields act on the liquid jet to adjust jet morphology under the action of acoustic radiation pressures.

The specific working process and working principle are as follows:

The ultrasonic generator is turned on to emit ultrasonic waves from the ultrasonic transducers, and the reflector is adjusted to the corresponding position. The ultrasonic waves are reflected by the reflector, forming a standing wave sound field. The same process is repeated for the two sets of ultrasonic transducers and reflectors, forming two intersecting and perpendicular standing wave sound fields. The distance between the reflectors and the ultrasonic transducers can be calculated using the following formula:

$$L = \frac{nc}{2f}, n = 1, 2, 3$$

where L is the distance between the reflector and the generator, c is the speed of sound, and f is the vibration frequency of the generator.

The liquid jet is ejected at the common nodes of the two standing wave sound fields, subjected to the action of two radial acoustic radiation pressures. By adjusting the sound pressure, control and adjustment of the liquid jet diameter and flow rate can be achieved.

Based on the jet diameter, the range of jet instability frequency can be calculated. Typically, the jet instability frequency should satisfy the following condition:

$$f_j < \frac{v}{2\pi r}$$

where represents the jet instability frequency, v represents a jet velocity, and r represents a jet radius. According to the conservation of mass, the jet velocity can also be calculated as follows:

$$v = \frac{\dot{V}}{\pi r^2}$$

where $\dot{V}$ represents a volumetric flow rate of the jet.

Based on the unstable frequency, a modulated waveform can be superimposed to achieve control over jet breakup, i.e., droplet size control, allowing for control over the disturbance frequency and modulation depth, as well as more precise control over the breakup length, unstable wavelength, and the diameter of the generated droplets, thus achieving the function of generating monodisperse droplets.

The present disclosure is based on the principle of acoustic radiation pressure and achieves precise control of the jet diameter through a dual-axis orthogonal ultrasonic field. On this basis, by superimposing a modulated sound field, it realizes control over the jet breakup length and droplet diameter. Compared to traditional electric control and ultrasonic control, the present disclosure can adjust the jet diameter and apply corresponding disturbances based on the jet diameter, achieving high precision and wide-range control for droplet generation.

In other embodiments, the ultrasonic generator 1 further includes two sets of ultrasonic signal generators 13 and two sets of power amplifiers 12. The two sets of power amplifiers 12 are electrically connected to the two sets of ultrasonic transducers 11, respectively, and the ultrasonic signal generators 13 are electrically connected to the two sets of power amplifiers 12. Both the ultrasonic signal generators 13 and the power amplifiers 12 are placed on an optical platform 4.

In other specific embodiments, the optical platform 4 is connected to two sets of adjustable sliding rails 7 that are both dual-axis adjustable sliding rails that allow for X and Y axis adjustments. The adjustable sliding rails 7 are connected to a clamping seat 8 for fixing the ultrasonic transducers 11, allowing the clamping seat to adjust its position in the X and Y directions under the action of the adjustable sliding rails. This further adjusts the positional relationship between the ultrasonic transducers 11 and the reflectors 2, obtaining stable standing wave sound fields.

In other embodiments, the optical platform 4 is connected to vertical rails 5, on which a telescopic platform 6 is slidably connected. The nozzle 31 is fixedly connected to a telescopic end of the telescopic platform 6, allowing for adjustment of a horizontal position of the nozzle 31. The telescopic platform can move up and down on the vertical rails, and the nozzle can adjust its horizontal position on the telescopic platform, thereby positioning the nozzle directly above an intersection of pressure nodes of the two standing wave fields at a height of 1.5-2 cm. The optical platform 4 is connected to an injection pump 32, with an outlet of the injection pump 32 connected to the nozzle 31 to provide a liquid jet at a specific speed.

In other embodiments, a power range obtained through joint adjustment by the ultrasonic signal generator 13 and the power amplifiers 12 is 0 to 2 kW, with a frequency range of a generated alternating voltage being 0.2 kHz to 40 kHz.

In other embodiments, a frequency range of the ultrasonic transducers 11 is 15.0 kHz to 40.0 kHz, and a power of the ultrasonic transducers 11 is 0.3 kW to 2 kW.

In other specific embodiments, the injection pump 32 is a peristaltic pump, with a flow rate of 10 to 90 ml/min. The nozzle 31 specifically includes a nozzle segment and a connector segment, with a connection end of the connector segment connected to an outlet pipeline of the injection pump, and a diameter of the connector segment being 1 to 3 mm.

In other embodiments, the distance between the ultrasonic transducers 11 and the reflectors 2 satisfies the following formula: $d_1$=Ac/f, where $d_1$ represents the distance, A is a value coefficient that can take values of 0.95-1.05, 1.9-2.1, etc., c represents a local speed of sound, and f represents the ultrasonic frequency. Theoretically, A can take values of 1, 2, etc., corresponding to nodes at different positions. At these positions, control over the jet can be achieved. However, in practical applications, the value of A cannot be precisely set to 1, 2, etc.; therefore, a range is defined within which the aforementioned phenomena can occur.

In other embodiments, a distance from an ultrasonic focus area generated by the ultrasonic transducer 11 in conjunction with the reflector 2 to the reflector is defined as follows:

$$d_2 = Bc/f,\ B = C\frac{2n+1}{4},\ C = 0.95 - 1.05,\ B < A.$$

In other embodiments, a distance between the liquid jet provided by the liquid jet device and the reflector is in a range of 5-35 mm.

The present disclosure also discloses a control method using the ultrasonic control apparatus for a liquid jet, which includes the following steps:

Step 1: Power on the ultrasonic generator, causing the two sets of ultrasonic transducers to generate specific ultrasonic waves.

Step 2: Adjust positions of the ultrasonic transducers and the distance between the ultrasonic transducers and the reflectors, to ensure that center lines of sound fields formed by the two sets of ultrasonic transducers and the corresponding reflectors are coplanar and perpendicular to each other, thereby forming stable standing wave sound fields between the ultrasonic transducers and the reflectors.

Step 3: Adjust a position of the nozzle, such that the nozzle is directly above an intersection of pressure nodes of the two standing wave sound fields.

Step 4: Connect the nozzle to an external pumping source, allowing the nozzle to emit a continuous jet; adjust a power of the ultrasonic generator to increase an ultrasonic amplitude and enhance an acoustic radiation pressure, where the ultrasonic waves are reflected by the reflectors, generating the standing wave sound fields, and the jet is narrowed under the action of the acoustic radiation pressure; the ultrasonic waves from two directions act on the jet, thus achieving control over a diameter and flow rate of the jet.

Step 5: Based on the diameter of the jet, determine a modulation signal frequency; modulate an input signal, superimpose a modulation signal, and superimpose a low-frequency signal on a high-frequency input to generate modulated ultrasound; and adjust a modulation depth to achieve control over the jet breakup length and the size of generated droplets.

Since an apparatus and usage method disclosed in the embodiments correspond to a method disclosed in the embodiments, their description is relatively simple, and reference may be made to partial description of the method for relevant contents.

The above description of the disclosed embodiments enables those skilled in the art to achieve or use the present disclosure. Various modifications to these embodiments are readily apparent to those skilled in the art, and the generic principles defined herein may be practiced in other embodiments without departing from the spirit or scope of the present disclosure. Thus, the present disclosure is not limited to the embodiments shown herein but falls within the widest scope consistent with the principles and novel features disclosed herein.

What is claimed is:

1. An ultrasonic control apparatus for a liquid jet, comprising:

an ultrasonic generator (1) equipped with two sets of ultrasonic transducers (11) arranged perpendicularly to each other, wherein the two sets of ultrasonic transducers (11) emit ultrasonic waves of a specific frequency; the ultrasonic generator (1) further comprises two sets of ultrasonic signal generators (13) and two sets of power amplifiers (12); the two sets of power amplifiers (12) are electrically connected to the two sets of ultrasonic transducers (11), respectively, and the ultrasonic signal generators (13) are electrically connected to the two sets of power amplifiers (12); both the ultrasonic signal generators (13) and the power amplifiers (12) are placed on an optical platform (4)

two sets of reflectors (2) arranged correspondingly in front of the ultrasonic waves emitted by the two sets of ultrasonic transducers (11), wherein a distance exists between the ultrasonic transducers (11) and the corresponding reflectors (2), two stable standing wave sound fields are formed by adjusting the distance, and center lines of the two standing wave sound fields are coplanar and perpendicular to each other; the optical platform (4) is connected to two sets of adjustable sliding rails (7); the adjustable sliding rails (7) are connected to a clamping seat (8) for fixing the ultrasonic transducers (11), allowing the ultrasonic transducers (11) to adjust a positional relationship with the reflectors (2) under the action of the adjustable sliding rails (7); and a liquid jet device (3) equipped with a nozzle (31) that emits a continuous jet, wherein the nozzle (31) is located above an intersection of pressure nodes of the two standing wave sound fields, and the two standing wave sound fields act on the liquid jet to adjust jet morphology under the action of acoustic radiation pressures.

2. The ultrasonic control apparatus for a liquid jet according to claim 1, wherein the two sets of adjustable sliding rails (7) are dual-axis adjustable sliding rails that allow for X and Y axis adjustments.

3. The ultrasonic control apparatus for a liquid jet according to claim 1, wherein the optical platform (4) is connected to vertical rails (5) on which a telescopic platform (6) is slidably connected; the nozzle (31) is fixedly connected to a telescopic end of the telescopic platform (6) and adjusts a horizontal position of the nozzle (31); the optical platform (4) is connected to an injection pump (32), wherein an outlet of the injection pump (32) is connected to the nozzle (31) to provide a liquid jet at a specific speed.

4. The ultrasonic control apparatus for a liquid jet according to claim 1, wherein a power range obtained through joint adjustment by the ultrasonic signal generator (13) and the power amplifiers (12) is 0 to 2 kW, with a frequency range of a generated alternating voltage being 0.2 kHz to 40 kHz.

5. The ultrasonic control apparatus for a liquid jet according to claim 1, wherein a frequency range of the ultrasonic transducers (11) is 15.0 kHz to 40.0 kHz, and a power of the ultrasonic transducers (11) is 0.3 kW to 2 kW.

6. The ultrasonic control apparatus for a liquid jet according to claim 3, wherein the injection pump (32) is a peristaltic pump, with a jet flow rate of 10 to 90 ml/min; a connection end of the nozzle (31) is connected to an outlet pipeline of the injection pump, and the connection end has a pipe diameter of 1 to 3 mm.

7. The ultrasonic control apparatus for a liquid jet according to claim 1, wherein the distance between the ultrasonic transducers (11) and the reflectors (2) satisfies the following formula: $d_1=Ac/f$, wherein $d_1$ represents the distance, and A is a value coefficient, with different values of A corresponding to nodes at different positions; c represents a local sound speed and f represents an ultrasonic frequency.

8. The ultrasonic control apparatus for a liquid jet according to claim 7, wherein a distance from an ultrasonic focus area generated by the ultrasonic transducer (11) in conjunction with the reflector (2) to the reflector is defined as follows:

$$d_2 = Bc/f,\ B = C\frac{2n+1}{4},\ C = 0.95 - 1.05,\ B < A;$$

wherein B is a value coefficient that varies at different positions, and B and C are coefficients that jointly determine node positions; C is a value coefficient that is theoretically set to 1, but in practice is not 1, and thus a value range is defined for C; B and C together determine the distance between the ultrasonic focus area and the reflector.

9. A control method using the ultrasonic control apparatus for a liquid jet according to claim 1, comprising the following steps:

step 1: powering on the ultrasonic generator, causing the two sets of ultrasonic transducers to generate specific ultrasonic waves;

step 2: adjusting positions of the ultrasonic transducers and the distance between the ultrasonic transducers and the reflectors, to ensure that center lines of sound fields formed by the two sets of ultrasonic transducers and the corresponding reflectors are coplanar and perpendicular to each other, thereby forming stable standing wave sound fields between the ultrasonic transducers and the reflectors;

step 3: adjusting a position of the nozzle, such that the nozzle is directly above an intersection of pressure nodes of the two standing wave sound fields;

step 4: connecting the nozzle to an external pumping source, allowing the nozzle to emit a continuous jet; adjusting a power of the ultrasonic generator to increase an ultrasonic amplitude and enhance an acoustic radiation pressure, wherein the ultrasonic waves are reflected by the reflectors, generating the standing wave sound fields, and the jet is narrowed under the action of the acoustic radiation pressure; the ultrasonic waves from two directions act on the jet, thus achieving control over a diameter and flow rate of the jet; and step 5: modulating an input signal by superimposing a low-frequency signal on a high-frequency input to generate modulated ultrasound, achieving control over a droplet size after jet breakup.

10. The control method according to claim 9, wherein the two sets of adjustable sliding rails (7) are dual-axis adjustable sliding rails that allow for X and Y axis adjustments.

11. The control method according to claim 9, wherein the optical platform (4) is connected to vertical rails (5) on which a telescopic platform (6) is slidably connected; the nozzle (31) is fixedly connected to a telescopic end of the telescopic platform (6) and adjusts a horizontal position of the nozzle (31); the optical platform (4) is connected to an injection pump (32), wherein an outlet of the injection pump (32) is connected to the nozzle (31) to provide a liquid jet at a specific speed.

12. The control method according to claim 9, wherein a power range obtained through joint adjustment by the ultrasonic signal generator (13) and the power amplifiers (12) is 0 to 2 kW, with a frequency range of a generated alternating voltage being 0.2 kHz to 40 KHz.

13. The control method according to claim 9, wherein a frequency range of the ultrasonic transducers (11) is 15.0 kHz to 40.0 kHz, and a power of the ultrasonic transducers (11) is 0.3 kW to 2 kW.

14. The control method according to claim 11, wherein the injection pump (32) is a peristaltic pump, with a jet flow rate of 10 to 90 ml/min; a connection end of the nozzle (31) is connected to an outlet pipeline of the injection pump, and the connection end has a pipe diameter of 1 to 3 mm.

15. The control method according to claim 9, wherein the distance between the ultrasonic transducers (11) and the reflectors (2) satisfies the following formula: $d_1=Ac/f$, wherein $d_1$ represents the distance, and A is a value coefficient, with different values of A corresponding to nodes at different positions; c represents a local sound speed and f represents an ultrasonic frequency.

16. The control method according to claim 15, wherein a distance from an ultrasonic focus area generated by the ultrasonic transducer (11) in conjunction with the reflector (2) to the reflector is defined as follows:

$$d_2 = Bc/f,\ B = C\frac{2n+1}{4},\ C = 0.95 - 1.05,\ B < A;$$

wherein B is a value coefficient that varies at different positions, and B and C are coefficients that jointly determine node positions; C is a value coefficient that is theoretically set to 1, but in practice is not 1, and thus a value range is defined for C; B and C together determine the distance between the ultrasonic focus area and the reflector.

* * * * *